(12) United States Patent
Adams

(10) Patent No.: US 8,832,950 B1
(45) Date of Patent: Sep. 16, 2014

(54) SHORING BATTEN AND METHOD OF USING THE SAME

(71) Applicant: Joseph Adams, Santee, CA (US)

(72) Inventor: Joseph Adams, Santee, CA (US)

( * ) Notice: Subject to any disclaimer, the term of this patent is extended or adjusted under 35 U.S.C. 154(b) by 225 days.

(21) Appl. No.: 13/650,134

(22) Filed: Oct. 12, 2012

(51) Int. Cl.
*B43L 7/10* (2006.01)
*G01B 3/56* (2006.01)

(52) U.S. Cl.
USPC .................................. 33/462; 33/464; 33/534

(58) Field of Classification Search
USPC .................... 33/1 N, 418, 424, 462, 464, 534
See application file for complete search history.

(56) References Cited

U.S. PATENT DOCUMENTS

| | | | | |
|---|---|---|---|---|
| 2,647,322 A | * | 8/1953 | Eliason | 33/462 |
| 3,991,474 A | * | 11/1976 | Rath | 33/462 |
| 5,440,818 A | * | 8/1995 | Mailhot | 33/452 |
| 6,134,797 A | * | 10/2000 | Boyce | 33/464 |
| 7,269,909 B1 | * | 9/2007 | Barbieri | 33/424 |
| 8,122,611 B1 | * | 2/2012 | Kallsen | 33/462 |
| 2009/0025238 A1 | * | 1/2009 | Bowman | 33/424 |
| 2012/0159797 A1 | * | 6/2012 | Roth | 33/424 |

* cited by examiner

*Primary Examiner* — G. Bradley Bennett
(74) *Attorney, Agent, or Firm* — Plager Schack LLP

(57) ABSTRACT

A method of measuring shores that is quick and efficient uses available ship board technology. The method comprises aligning an improved shoring batten between a first surface and a second surface in a first location where the improved shoring batten further comprises an upper angle indicator, a lower angle indicator and a measurement indicator. Next a user, communicates an upper angle from the upper angle indicator, a lower angle from the lower angle indicator and a length measurement from the measurement indicator to a second location. Then, a user affixes an upper remote angle indicator to a shore and aligning the upper remote angle indicator to the upper angle. Finally, a user cuts the shore to the upper angle in a manner that is faster and more efficient since there is no need to transport the improved shoring batten.

5 Claims, 3 Drawing Sheets

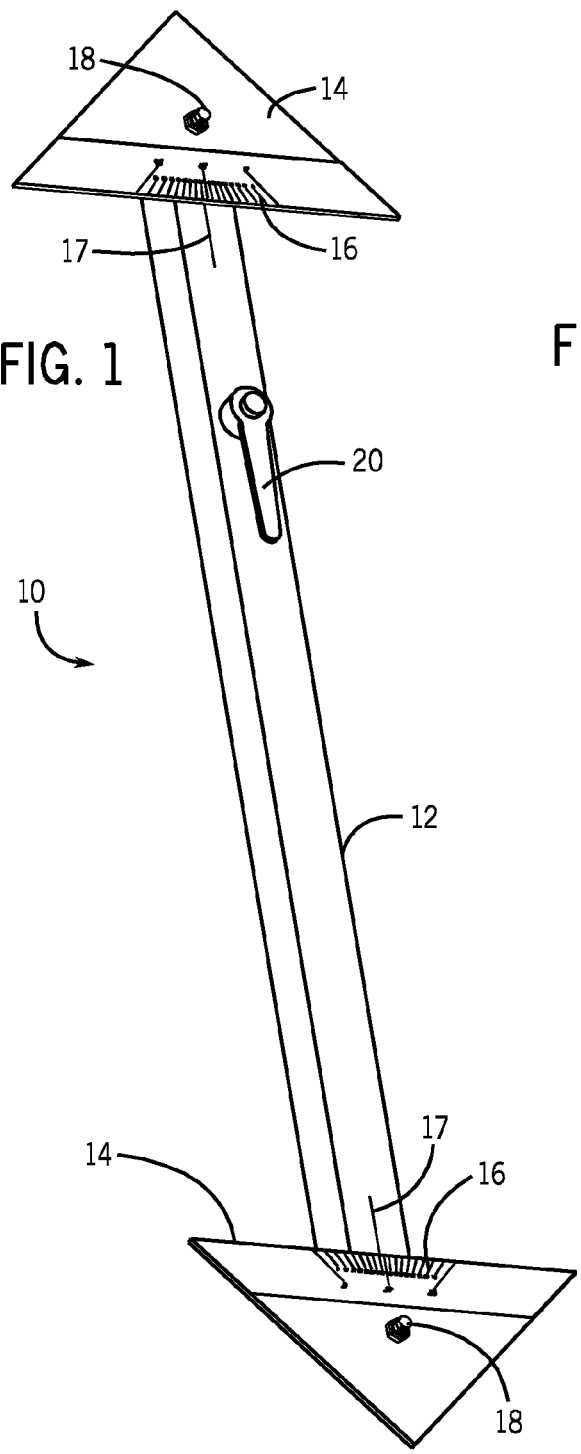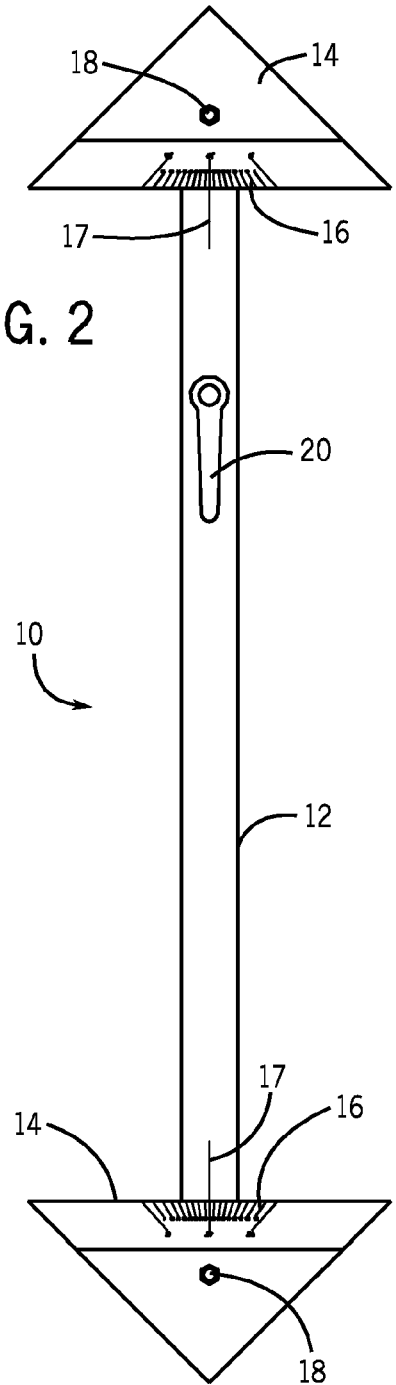

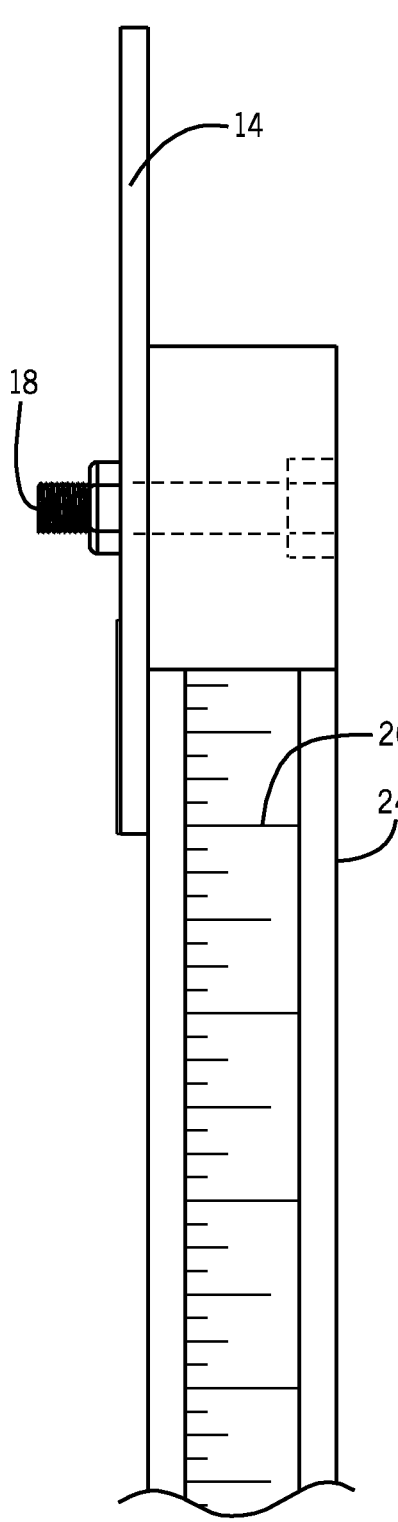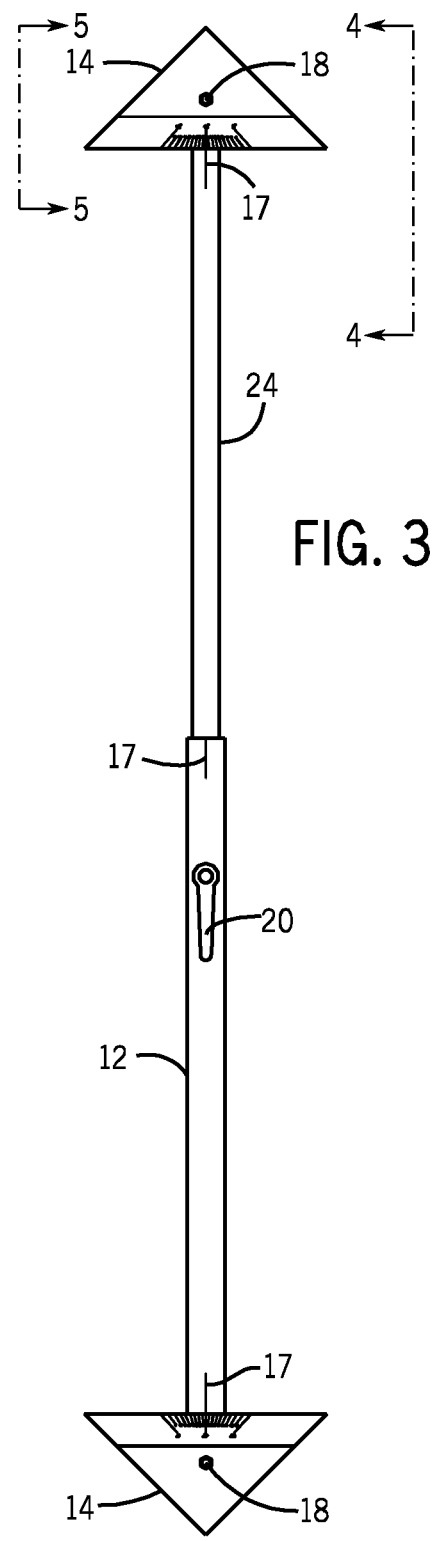

SHORING BATTEN AND METHOD OF USING THE SAME

FIELD OF THE INVENTION

This invention relates to techniques for measuring wood shoring onboard ships.

BACKGROUND OF THE INVENTION

Shoring is often used aboard ships to support ruptured decks, to strengthen weakened bulkheads and decks, to build up temporary decks and bulkheads against the sea, to support hatches and doors, and to provide support for equipment that has broken loose.

The basic materials required for shoring are as follows: shores, wedges, sholes, and strongbacks. A shore is a portable beam. A wedge is a block, triangular on the sides and rectangular on the butt end. A shole is a flat block that may be placed under the end of a shore to distribute pressure. A strongback is a bar or beam of wood or metal that is used to distribute pressure or to serve as an anchor for a patch. The strongback is often shorter than a shore.

As a practical matter, shoring is a very difficult process. It is difficult to discern how long to cut various members and at what angles to cut them. Since about 1960, "The most rapid and accurate way to measure a shore for cutting is to use an adjustable shoring batten." Damage Controlman, Naval Education and Training Publication 14057-PPR, 8-10 (2005), which is incorporated by reference. The Navy explains:

To use the shoring batten, extend it to the required length and lock it with the thumbscrews on the length locking device. Then measure the angles of cut by adjusting the hinged metal pieces at the ends of the batten. Lock the angle locking devices in place. Lay the batten along the shore. Mark and cut the timber to the proper length and angle. Shores should be cut one-half of an inch shorter than the measured length to allow space to install wedges.

The disadvantage with the currently used shoring batten in the Navy is that it must first be brought to the scene of damage to take the measurements and then must be transported back to a cutting station to trace the length and angles onto raw lumber for precise cutting. That same shoring batten must then be transported back to the scene of damage to take additional measurements. This process is time consuming and puts Sailors in danger as they continue to transit the ship while it is flooding, or taking enemy flooding.

The present invention teaches a method of using similarly calibrated devices in parallel in order to determine the length of shores and the angles to cut them. This way cut shoring can be brought to the scene without an intermediate step.

BRIEF SUMMARY OF THE INVENTION

A method of measuring shores that is quick and efficient uses available ship board technology. The method comprises aligning an improved shoring batten between a first surface and a second surface in a first location where the improved shoring batten further comprises an upper angle indicator, a lower angle indicator and a measurement indicator. Next a user communicates an upper angle from the upper angle indicator, a lower angle from the lower angle indicator and a length measurement from the measurement indicator to a second location. Then, a user affixes an upper remote angle indicator to a shore and aligning the upper remote angle indicator to the upper angle. Finally, a user cuts the shore to the upper angle in a manner that is faster and more efficient since there is no need to transport the improved shoring batten.

A user can supplement this method by affixing a lower remote angle indicator to a shore and aligning the lower remote angle indicator to the lower angle and cutting the shore to the lower angle. The shore possesses the length on the measurement indicator.

Also, an improved shoring batten allows for rapid determination of length and angles to be cut which can be easily communicated. The improved shoring batten comprises an outer telescoping tube that slides adjacent to an inner telescoping tube. The inner telescoping is mechanically coupled to an upper angle indicator. The outer telescoping tube is mechanically coupled to a lower angle indicator and a measurement indicator. The upper angle indicator and lower angle indicator can be fixed into place with a pivot bolts. In this manner the improved shoring batten can be expanded to replicate a readily discernible length, an upper angle and a lower angle to cut a shore.

BRIEF DESCRIPTION OF THE SEVERAL VIEWS OF THE DRAWINGS

Having thus described the invention in general terms, reference will now be made to the accompanying drawings, which are not necessarily drawn to scale, and wherein:

FIG. 1 is a front perspective view of the improved shoring batten.

FIG. 2 is a front elevation view.

FIG. 3 is a front elevation view, similar to FIG. 2, showing the invention in an extended position.

FIG. 4 is a detail side view, indicated by line 4-4 of FIG. 3.

Figure 5:
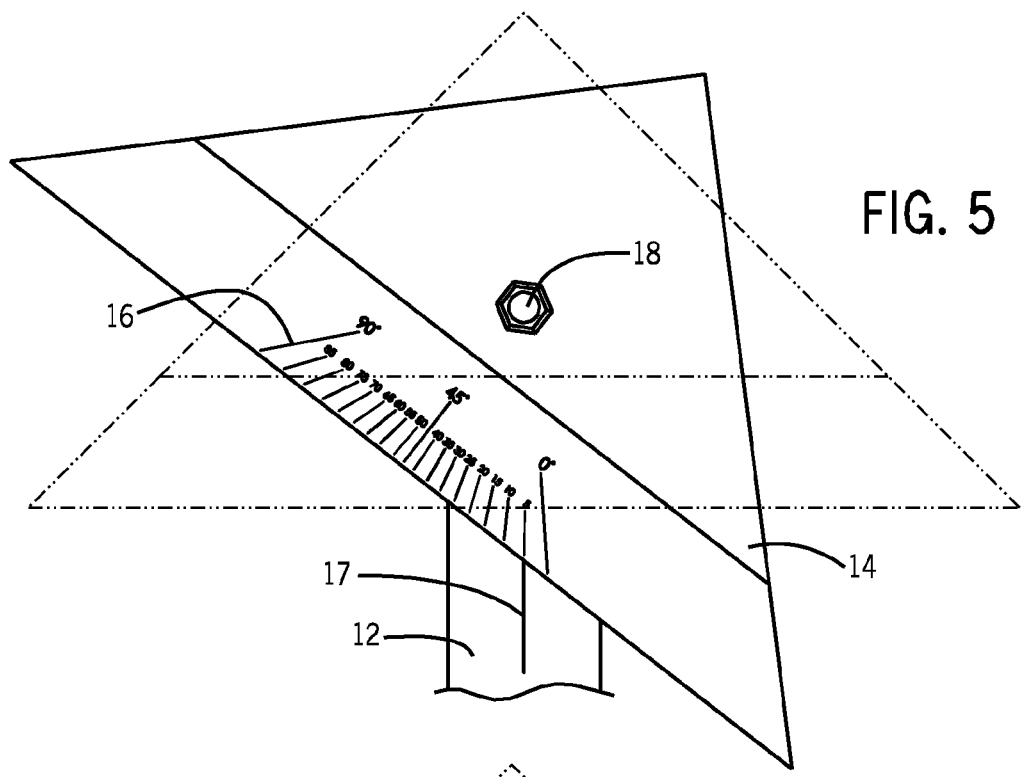

FIG. 5 is a detail front elevation showing the angle indicator in an angle-measuring position, indicated by line 5-5 of FIG. 3.

Figure 6:
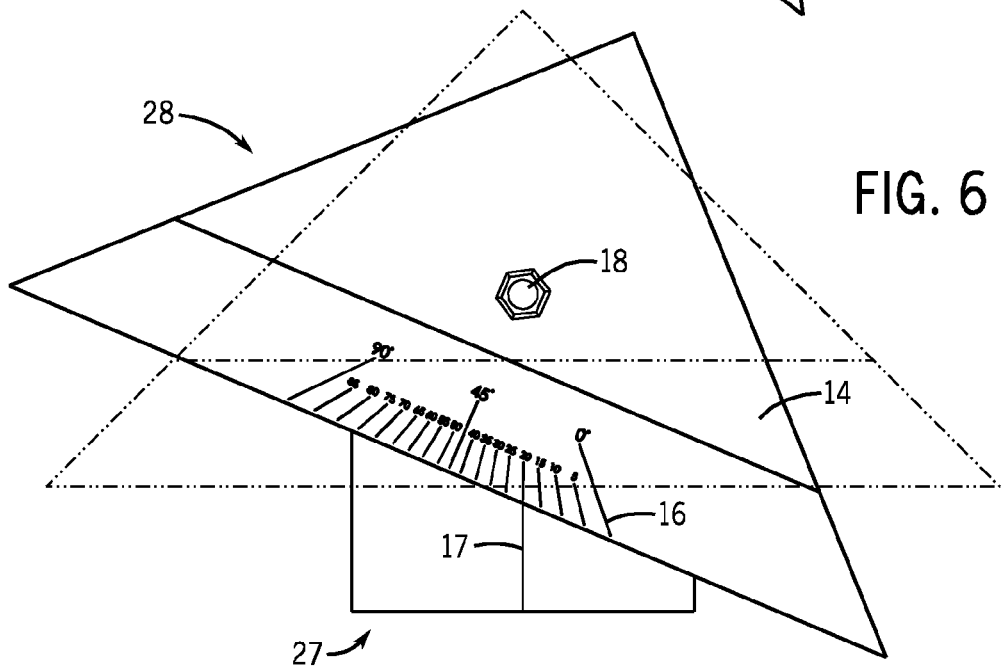

FIG. 6 is a detail front elevation view of the remote angle indicator.

DETAILED DESCRIPTION OF THE INVENTION

Embodiments of the present invention overcome many of the obstacles associated with quickly measuring and cutting shoring, and now will be described more fully hereinafter with reference to the accompanying drawings that show some, but not all embodiments of the claimed inventions. Indeed, the invention may be embodied in many different forms and should not be construed as limited to the embodiments set forth herein. Rather, these embodiments are provided so that this disclosure will satisfy applicable legal requirements. Like numbers refer to like elements throughout.

FIG. 1 and FIG. 2 show perspective views of improved shoring batten 10. Improved shoring batten 10 comprises outer telescoping tube 12 mechanically coupled to two angle indicators 14 by pivot bolts 18. Angle indicator 14 is a right triangle where the right angle is opposite angle indicia 16. The center of outer telescoping tube 12 proximate angle indicator 14 is marked with benchmark 14. Outer telescoping tube 12 can be mechanically coupled to inner telescoping tube 24 with length adjustment handle 20 as shown in FIG. 3 and FIG. 4.

FIG. 3 and FIG. 4 show the movement of inner telescoping tube 24 out of outer telescoping tube 12. A user can pull inner telescoping tube 24 to a desired length and then read the length from measurement indicator 26. Unlike the prior art, the lengths and angles can be quickly communicated to a repair locker that can quickly measure and manufacture the shores in the following manner.

Align the strongback as desired. Align a first shoring batten 10 as necessary, for instance from the deck to the strongback. Next, read the upper angle from upper angle indicator 14, the lower angle from lower angle indicator 14 and the length from measurement indicator 26 to the repair locker. If necessary, a user can repeat this process with as many shores as desired. The repair locker can then use remote angle indicator 28 to cut the shores.

FIG. 5 and FIG. 6 show the relationship between angle indicator 14 and remote angle indicator 28. Remote angle indicator 28 can be affixed to shore 27 and then aligned to the angle designated by angle indicator 14. Remote angle indicator 28 can have angle indicia 16 aligned with central line 17 which can be drawn on shore 27 with a pencil and then held in place by tightening pivot bolt 18.

That which is claimed:

1. A method of measuring shores which can be quick and efficient using available ship board technology, the method comprising, aligning an improved shoring batten between a first surface and a second surface in a first location where the improved shoring batten further comprises an upper angle indicator, a lower angle indicator and a measurement indicator;

communicating an upper angle from the upper angle indicator, a lower angle from the lower angle indicator and a length measurement from the measurement indicator to a second location;

affixing an upper remote angle indicator to a shore and aligning the upper remote angle indicator to the upper angle; and cutting the shore to the upper angle in a manner that is faster and more efficient since there is no need to transport the improved shoring batten.

2. The method of claim 1, affixing a lower remote angle indicator to a shore and aligning the lower remote angle indicator to the lower angle; and cutting the shore to the lower angle.

3. The method of claim 1, affixing a lower remote angle indicator to a shore and aligning the lower remote angle indicator to the lower angle; and cutting the shore to the lower angle; where the shore possesses the length on the measurement indicator.

4. An improved shoring batten which allows for rapid determination of length and angles to be cut which can be easily communicated, the improved shoring batten comprising an outer telescoping tube that slides adjacent to an inner telescoping tube;

the inner telescoping is mechanically coupled to an upper angle indicator; the outer telescoping tube is mechanically coupled to a lower angle indicator and a measurement indicator;

where the upper angle indicator and lower angle indicator can be fixed into place with a pivot bolts; in this manner the improved shoring batten can be expanded to replicate a readily discernible length, an upper angle and a lower angle to cut a shore.

5. The improved shoring batten of claim 4, further comprising, the outer telescoping tube that slides adjacent to the inner telescoping tube can be fixed to the inner telescopic tube with a handle to reveal a measurement indicator.

\* \* \* \* \*